US011167598B2

(12) United States Patent
Yamaguchi (10) Patent No.: US 11,167,598 B2
(45) Date of Patent: Nov. 9, 2021

(54) HEAVY DUTY PNEUMATIC TIRE (71) Applicant: The Yokohama Rubber Co., LTD., Tokyo (JP)

(72) Inventor: Yukihito Yamaguchi, Hiratsuka (JP)

(73) Assignee: The Yokohama Rubber Co., LTD.

( * ) Notice: Subject to any disclaimer, the term of this patent is extended or adjusted under 35 U.S.C. 154(b) by 354 days.

(21) Appl. No.: 16/088,803

(22) PCT Filed: Mar. 30, 2017

(86) PCT No.: PCT/JP2017/013422
§ 371 (c)(1),
(2) Date: Sep. 26, 2018

(87) PCT Pub. No.: WO2017/170946
PCT Pub. Date: Oct. 5, 2017

(65) Prior Publication Data
US 2019/0054773 A1 Feb. 21, 2019

(30) Foreign Application Priority Data
Mar. 31, 2016 (JP) .............................. JP2016-072216

(51) Int. Cl.
B60C 11/11 (2006.01)
B60C 11/13 (2006.01)
B60C 11/03 (2006.01)

(52) U.S. Cl.
CPC ............... B60C 11/11 (2013.01); B60C 11/03 (2013.01); B60C 11/0306 (2013.01);
(Continued)

(58) Field of Classification Search
CPC ............. B60C 11/0311; B60C 11/1369; B60C 2011/0348; B60C 2011/0353; B60C 2011/0355; B60C 2011/0367
See application file for complete search history.

(56) References Cited

U.S. PATENT DOCUMENTS 6,761,196 B2 * 7/2004 Takubo ................. B60C 11/033
152/209.17
2007/0012389 A1 1/2007 Ito
(Continued)

FOREIGN PATENT DOCUMENTS

JP H07-081326 3/1995
JP 2000-264018 9/2000
(Continued)

OTHER PUBLICATIONS

Machine translation for Japan D1520593 S (Year: 2020).*
(Continued)

Primary Examiner — Steven D Maki
(74) Attorney, Agent, or Firm — Thorpe North & Western (57) ABSTRACT A heavy duty pneumatic tire includes a tread pattern that includes circumferential main grooves, a center wide groove extending in a center region between the circumferential main grooves, and center lug grooves disposed in a first center region and a second center region on either side of the center wide groove in the tire lateral direction, the center lug grooves having a linear shape and opening to the center wide groove. The center lug grooves and the circumferential main grooves have a narrower groove width than shoulder lug grooves disposed in a shoulder region. The center lug grooves of the first center region and the center lug grooves of the second center region extend parallel with one another. The center wide groove has a constant groove depth that is shallower than the maximum groove depth of the circumferential main grooves and the center lug grooves.

20 Claims, 5 Drawing Sheets (52) U.S. Cl.
CPC ........... *B60C 11/0311* (2013.01); *B60C 11/13* (2013.01); *B60C 11/1369* (2013.01); *B60C 2011/0344* (2013.01); *B60C 2011/0348* (2013.01); *B60C 2011/0353* (2013.01); *B60C 2011/0355* (2013.01); *B60C 2011/0365* (2013.01); *B60C 2011/0367* (2013.01); *B60C 2011/0369* (2013.01); *B60C 2011/0383* (2013.01); *B60C 2200/06* (2013.01); *B60C 2200/065* (2013.01)

(56) References Cited

U.S. PATENT DOCUMENTS

2007/0199633 A1    8/2007  Hayashi
2008/0289738 A1* 11/2008  Nakamura .......... B60C 11/0311
                                             152/209.24
2016/0332488 A1   11/2016  Araki

FOREIGN PATENT DOCUMENTS

| | | | |
|---|---|---|---|
| JP | 2007-022151 | | 2/2001 |
| JP | 2004-262295 A | * | 9/2004 |
| JP | 2007-022151 | | 2/2007 |
| JP | 2008-143409 A | * | 6/2008 |
| JP | 4676959 | | 4/2011 |
| JP | D1520593 S | * | 3/2015 |
| JP | 2015-134571 | | 7/2015 |
| WO | WO 2006/001202 | | 1/2006 |
| WO | WO 2015/107599 | | 7/2015 |

OTHER PUBLICATIONS

Machine translation for Japan 2004-262295 (Year: 2020).*
Machine translation for Japan 2008-143409 (Year: 2020).*
International Search Report for International Application No. PCT/JP2017/013422 dated Jun. 6, 2017, 4 pages, Japan.

* cited by examiner

HEAVY DUTY PNEUMATIC TIRE

TECHNICAL FIELD

The present technology relates to a heavy duty pneumatic tire with a tread pattern.

BACKGROUND ART

Heavy duty tires mountable on large vehicles such as dump trucks with a tread pattern provided with a plurality of blocks in the tread surface are known that ensure sufficient traction performance. However, such heavy duty tires provided with a plurality of blocks in the tread surface are susceptible to heat build-up due to the repeated deformation of the blocks during travelling, especially when long distances are travelled off-road. This heat build-up in the blocks can cause separation called heat separation between the tread rubber and the inner belt layers of the tread portion. Thus, there is a demand for heavy duty tires with high heat build-up resistance.

The tire described in Japanese Patent No. 4676959 is an example of a conventional heavy duty tire with a tread pattern provided with a plurality of blocks in the tread surface. The heavy duty tire of Japanese Patent No. 4676959 specifically includes a row of center blocks and rows of shoulder blocks. The center block row is defined by circumferential narrow grooves formed in the tire circumferential direction and lateral narrow grooves formed in the tire lateral direction. The shoulder block rows are defined by the circumferential narrow grooves and main lug grooves. The tread gauge in the tread center region is 95 mm or greater. The main lug grooves have a depth ranging from 70 to 80% of the tread gauge. The void ratio of the ground contact width ranges from 15 to 30%. The number of center blocks and shoulder blocks ranges from 32 to 44. The center blocks are each provided with one or more subsidiary narrow grooves with a length ranging from 100 to 180% of the circumferential length of the center block.

This heavy duty tire is described as having improved heat build-up resistance and being suitable for use on construction vehicles. Additionally, by the heavy duty tire including one or more subsidiary narrow grooves with a length ranging from 100 to 180% of the circumferential length of the center block, the cooling effect of the crown portion can be increased and cut separation resistance can be improved.

However, while a tire provided with subsidiary narrow grooves in the region of the center blocks can provide improved heat resistance, stones easily lodge in the subsidiary narrow grooves, especially when travelling off-road such as at mines. As such, the tire of Japanese Patent No. 4676959 cannot achieve good heat build-up resistance and stone rejecting characteristics in a compatible manner. In other words, one of the two properties described above cannot be improved while the other is maintained or improved.

SUMMARY

The present technology provides a heavy duty pneumatic tire that can provide improved heat build-up resistance or stone rejecting characteristics while maintaining or improving the other.

An aspect of the present technology is a heavy duty pneumatic tire with a tread pattern. The heavy duty pneumatic tire comprises a tread pattern comprising a pair of circumferential main grooves with a wave-like shape in a tire circumferential direction disposed in half-tread regions on a first side and a second side in a tire lateral direction of a tire equator line;

a center wide groove with a groove width wider than a groove width of the pair of circumferential main grooves that extends in the tire circumferential direction in a center region between the pair of circumferential main grooves;

a plurality of center lug grooves disposed at intervals in the tire circumferential direction in a first center region and a second center region, the first center region being located between one of the circumferential main grooves in the half-tread region on the first side and the center wide groove, the second center region being located between one of the circumferential main grooves located in the half-tread region on the second side and the center wide groove, the plurality center lug grooves each have a linear shape that extends at an incline with respect to the tire lateral direction and the tire circumferential direction and opens to the center wide groove; and a plurality of shoulder lug grooves disposed at intervals in the tire circumferential direction in both of the half-tread regions that extend outward in the tire lateral direction, with outer ends in the tire lateral direction that open to ground contact edges on both sides in the tire lateral direction, inner ends of the plurality of shoulder lug grooves in the tire lateral direction being located outward in the tire lateral direction of outer ends of the plurality of center lug grooves in the tire lateral direction, and the plurality of shoulder lug grooves being disposed one by one, in the tire circumferential direction, between adjacent center lug grooves of the plurality of center lug grooves adjacent in the tire circumferential direction.

The pair of circumferential main grooves each include a first groove turning portion that curves or bends protruding outward in the tire lateral direction and a second groove turning portion that curves or bends inward in the tire lateral direction, so that the pair of circumferential main grooves alternately connect to the outer ends of the plurality of center lug grooves in the tire lateral direction and the inner ends of the plurality of shoulder lug grooves in the tire lateral direction;

the plurality of center lug grooves and the pair of circumferential main grooves have groove widths narrower than groove widths of the plurality of shoulder lug grooves;

the plurality of center lug grooves disposed in the first center region and the plurality of center lug grooves disposed in the second center region extend parallel with one another and open to the center wide groove at alternating positions in the tire circumferential direction; and the center wide groove has a constant groove depth that is shallower than a maximum groove depth of the pair of circumferential main grooves and the plurality of center lug grooves.

Preferably, a ratio W1/W2 ranges from 2.8 to 3.4, where W1 is the groove width of the center wide groove and W2 is the groove width of the pair of circumferential main grooves.

Preferably, a ratio D1/D2 ranges from 0.05 to 0.2, where D1 is the groove depth of the center wide groove and D2 is a maximum groove depth of the pair of circumferential main grooves.

Preferably, the pair of circumferential main grooves have a shallower maximum groove depth than the plurality of center lug grooves; and the plurality of center lug grooves have a shallower maximum groove depth than the plurality of shoulder lug grooves.

Preferably, the heavy duty pneumatic tire further comprises a belt portion comprising a pair of cross belt layers with belt cords inclined with respect to the tire circumferential direction to opposite sides in the tire lateral direction; wherein the tread pattern comprises a plurality of center blocks formed in a row in the tire circumferential direction in the first center region and the second center region defined by the adjacent center lug grooves, the pair of circumferential main grooves, and the center wide groove; and a ratio WB/W5 ranges from 0.55 to 0.85, where WB is a length in the tire lateral direction of a region occupied by center block rows comprising a row of the center blocks of the first center region and a row of the center blocks of the second center region and the center wide groove, and W5 is a belt width in the tire lateral direction of an outermost belt layer of the belt portion.

Preferably, the pair of the circumferential main grooves each comprise a raised bottom portion which is a portion where a groove depth becomes shallower partially.

Preferably, a ratio D3/T ranges from 0.01 to 0.05, where D3 is a shallowest groove depth in the raised bottom portion and T is a tread width of the tread portion in the tire lateral direction.

Preferably, the center wide groove has a linear shape that runs on the tire equator line.

Preferably, a ratio W1/D1 ranges from 1.5 to 5.0, where D1 is the groove depth of the center wide groove and W1 is the groove width of the center wide groove.

Preferably, each of the pair of circumferential main grooves and the plurality of center lug grooves has a groove width ranging from 7 mm to 20 mm.

The heavy duty pneumatic tire is suitable to be mounted on a construction vehicle or an industrial vehicle.

A heavy duty pneumatic tire according to the present technology can provide improved heat build-up resistance or stone rejecting characteristics while maintaining or improving the other.

DETAILED DESCRIPTION

A heavy duty pneumatic tire according to embodiments of the present technology will be described below in detail.

Figure 1:
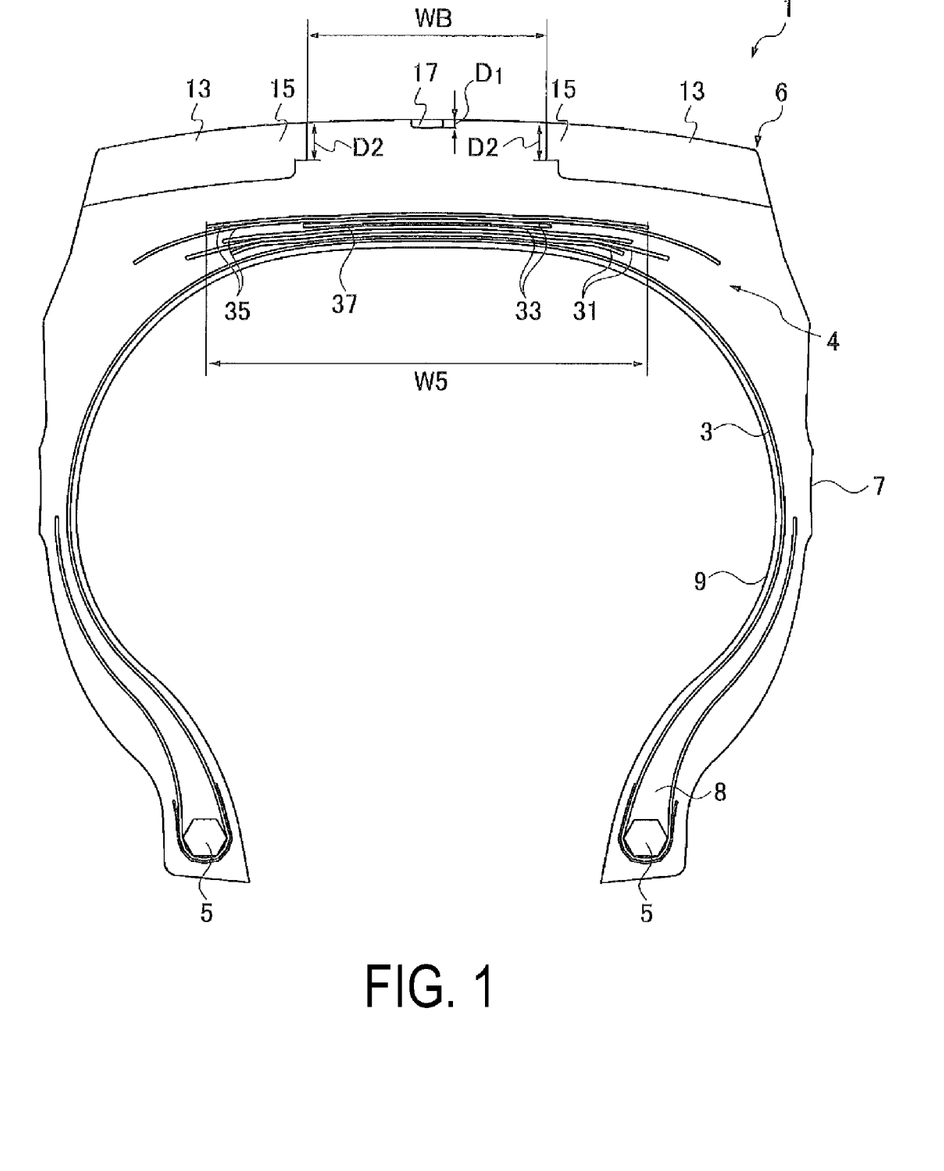
FIG. 1 is a cross-sectional view illustrating an example of a heavy duty pneumatic tire according to an embodiment of the present technology.

FIG. 1 is a cross-sectional view illustrating a portion of a heavy duty pneumatic tire (also referred to below as "tire") 1 of the present embodiment. In other words, FIG. 1 illustrates the profile of the tire 1 when the tire 1 is sectioned along a plane that includes the tire radial direction and the tire rotation axis, and passes through line I-I of FIG. 2 described below.

Heavy duty pneumatic tires in this specification include tires described in Section C of JATMA YEAR BOOK 2014 (standards of The Japan Automobile Tyre Manufacturers Association, Inc.) and tires for Classification 1 (dump trucks, scrapers), tires for Classification 2 (graders), tires for Classification 3 (shovel loaders and the like), tires for Classification 4 (tire rollers), and tires for mobile cranes (truck cranes, wheel cranes) described in Section D, or vehicular tires described in SECTION 4 or SECTION 6 of TRA (The Tire and Rim Association, Inc.) 2013 YEAR BOOK.

The tire 1 includes a carcass ply 3, a belt 4, and a pair of bead cores 5 as framework members, and a tread rubber 6, side rubbers 7, bead fillers 8, and an innerliner 9 as rubber members around the framework members.

The belt 4 includes a pair of first cross belt layers 31, a pair of second cross belt layers 33, and a pair of third cross belt layers 35. Also, a rubber sheet 37 is disposed in between the second cross belt layers 33. The first cross belt layers 31, the second cross belt layers 33, and the third cross belt layers 35 are each pairs of belt layers with belt cords that incline with respect to the tire circumferential direction to opposite sides in the tire lateral direction, and are disposed from inward to outward in the tire radial direction in the stated order.

Figure 2:
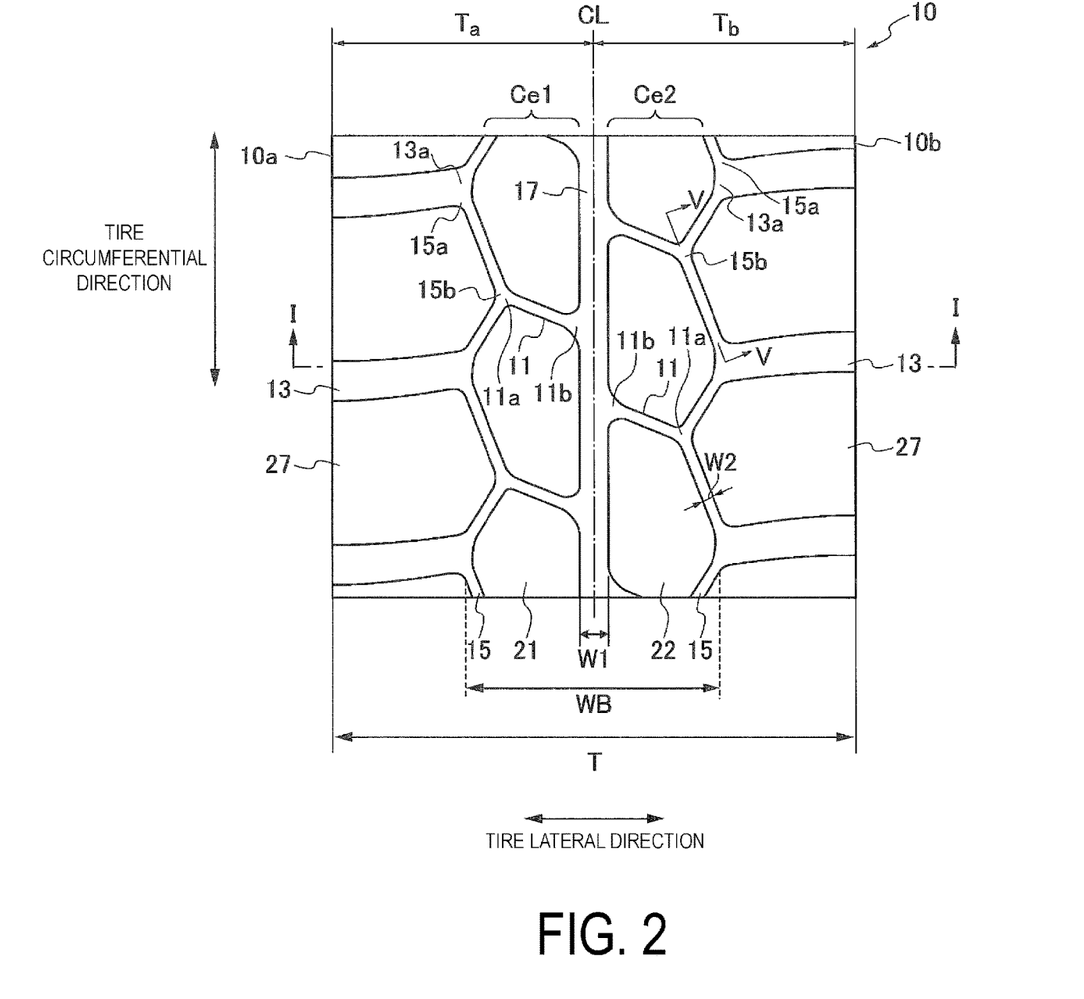
FIG. 2 is a developed plan view of an example of a tread pattern of a heavy duty pneumatic tire according to an embodiment of the present technology.

As illustrated in FIG. 2, the tread rubber 6 includes the tread pattern 10. FIG. 2 is a developed plan view of the tread pattern of the tire 1. Note that in FIG. 2, the up/down direction is the tire circumferential direction, and the left/right direction is the tire lateral direction. Herein, "tire circumferential direction" is the direction in which the rotating surface of the tread surface rotates, the rotating surface being formed when the tire 1 rotates about the center axis of rotation of the tire. "Tire lateral direction" is the direction of the center axis of rotation of the tire 1. "Tire radial direction" is the direction orthogonal to the tire circumferential direction and the tire lateral direction. The tread pattern does not have a designated rotation direction of the tire or an orientation in the tire lateral direction when mounted on a vehicle.

The tread pattern 10 includes a pair of circumferential main grooves 15, a center wide groove 17, center lug grooves 11, and shoulder lug grooves 13.

One of the circumferential main grooves 15 is disposed in each half-tread region Ta, Tb on either side of the tire equator line CL in the tire lateral direction, making a pair. The circumferential main groove 15 is provided with a first groove turning portion 15a and a second groove turning portion 15b, and is formed with a wave-like shape around the entire circumference in the tire circumferential direction. The first groove turning portion 15a is the portion of the circumferential main groove 15 that curves or bends protruding outward in the tire lateral direction. The second groove turning portion 15b is the portion of the circumferential main groove 15 that curves or bends protruding inward in the tire lateral direction. In the half-tread regions Ta, Tb, the circumferential main grooves 15 alternately connect to the ends 11a of the center lug grooves 11 and the inner ends 13a of the shoulder lug grooves 13 in the tire lateral direction. In this configuration, the circumferential main grooves 15 connect to the shoulder lug grooves 13 at the first groove turning portions 15a that curve protruding outward in the tire lateral direction and connect to the center lug grooves 11 at the second groove turning portions 15b that curve protruding inward in the tire lateral direction. A groove having a "wave-like shape" means that the groove has a meandering shape. The circumferential main grooves 15 includes a plurality of the first groove turning portions 15a and the second groove turning portions 15b around the tire circumference. The circumferential main grooves 15 extend in the tire circumferential direction in a meandering manner rendering the circumferential main grooves 15 in a wave-like shape that alternately connect the groove turning portions. By the circumferential main grooves 15 having a wave-like shape, the surface area of the groove walls of the circumferential main grooves 15 is increased. This improves heat dissipation. As a result, heat build-up resistance is improved.

The first groove turning portions 15a and the second groove turning portions 15b may have a bent shape, a rounded curved shape, or a combination of a bent shape and a curved shape. A curved shape includes a bent shape which has its corners rounded by a radius of curvature, for example. "A combination of a bent shape and a curved shape" refers to a shape which on one side of a corner of the first groove turning portion 15a or the second groove turning portion 15b, the groove extends in a linear manner and on the other side extends in a curved manner. The first groove turning portion 15a and the second groove turning portion 15b may have the same bent shape, curved shape, or combination thereof, or may have different shapes from each other. Additionally, the portions of the circumferential main grooves 15 other than the first groove turning portion 15a and the second groove turning portion 15b may have a linear shape or a curved shape. In an embodiment in which the first groove turning portion 15a and the second groove turning portion 15b and the portions other than the first groove turning portion 15a and the second groove turning portion 15b both have a curved shape, the two curved shapes may have the same radius of curvature.

As illustrated in FIG. 2, the circumferential main grooves 15 extend with a wave-like shape with an identical period length but out of phase in the tire circumferential direction. Specifically, the positions of the second groove turning portions 15b in the tire circumferential direction are offset in the tire circumferential direction from the second groove turning portions 15b in the half-tread region on the opposite side. Note that the circumferential main grooves 15 may extend in the tire circumferential direction with a wave-like shape having the same period length and be in phase, or may extend with wave-like shapes of different period lengths.

The circumferential main grooves 15 have a narrower groove width than the shoulder lug grooves 13. This allows the ground contact pressure on center blocks 21, 22 when running to be mitigated, and thus extend the wear life of the tire 1.

The center wide groove 17 has a wider groove width than the circumferential main grooves 15 and extends in the tire circumferential direction in the center region between the pair of circumferential main grooves 15. By the center wide groove 17 having such a configuration, sufficient groove volume is ensured in the center region. This ensures good air flow, and thus improves heat build-up resistance. Note that in the present specification, referring to simply the "center region" means the region between the pair of circumferential main grooves 15, and the region occupying a first center region Ce1, a second center region Ce2 (described below) and the center wide groove 17. In the present embodiment, the groove depth of the center wide groove 17 is constant as well as being shallower than the maximum groove depth of the circumferential main grooves 15 and the center lug grooves 11. When the center wide groove 17 has a wider groove width than the circumferential main grooves 15, stones may easily lodge in the groove and stone rejecting characteristics may be reduced. However, in the present embodiment, by the groove depth of the center wide groove 17 being shallower than the maximum groove depth of the circumferential main grooves 15 and the center lug grooves 11, stones that enter the groove are discharged. Thus, stone rejecting characteristics are improved. Additionally, by the groove depth of the center wide groove 17 being constant, the stone discharging function can be obtained all around the tire circumferential direction, ensuring constant stone rejecting characteristics in the tire circumferential direction. Though the groove depth of the center wide groove 17 is shallower than the maximum groove depth of the center lug grooves 11, the center wide groove 17 is rendered with localized deep portions where the groove bottom of the center lug grooves 11 cross the center wide groove 17. This allows stones to easily lodge in the groove, thus reducing the stone rejecting characteristics.

Figure 4A:
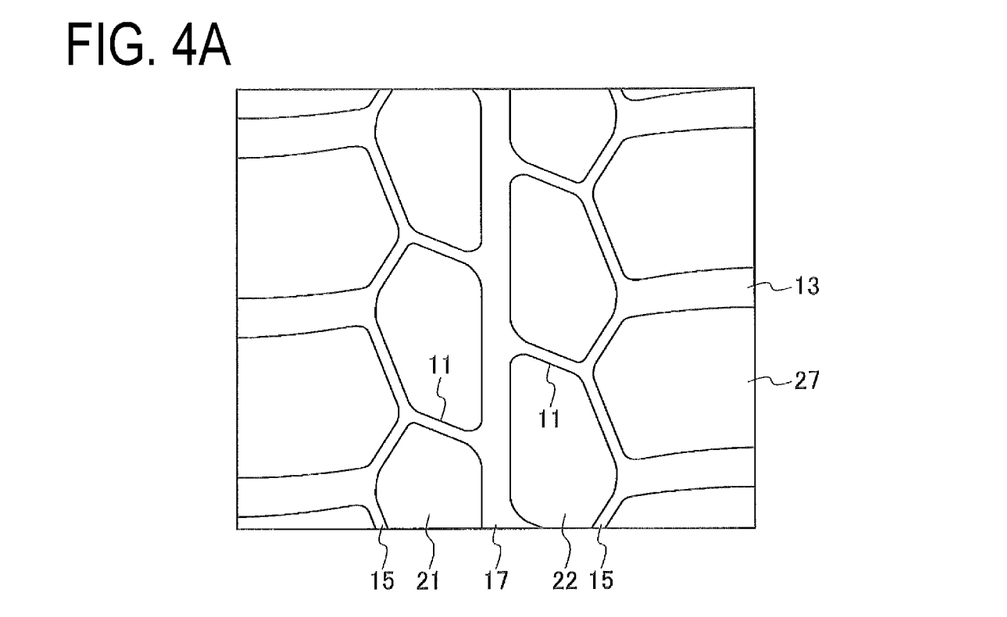
FIG. 4A is a drawing illustrating an example of a tread pattern of a heavy duty pneumatic tire according to an embodiment of the present technology in the early stages of wear.
Figure 4B:
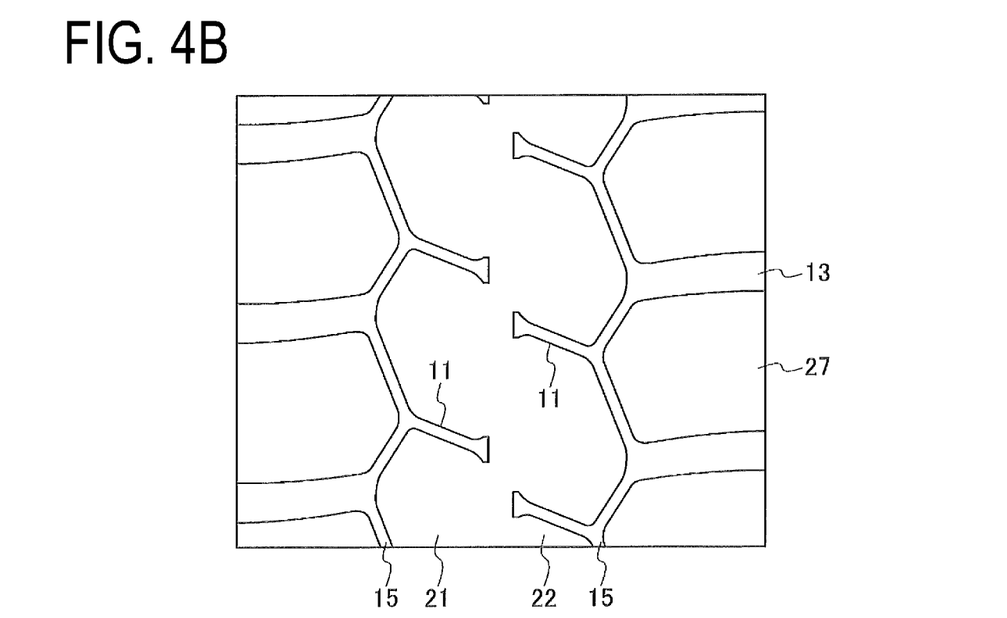
FIG. 4B is a drawing illustrating an example of a tread pattern of a heavy duty pneumatic tire according to an embodiment of the present technology after wear has progressed.

Note that by the center wide groove 17 having a groove depth shallower than the maximum groove depth of the circumferential main grooves 15 and the center lug grooves 11, when the tire 1 wears, the circumferential main grooves 15 and the center lug grooves 11 disappear in the early stages and the two center blocks 21, 22 join with the inner portion of the center wide groove 17 in the tire radial direction, forming a center land portion continuously extending in the tire circumferential direction as illustrated in FIG. 4B. FIG. 4B is a drawing illustrating a tread pattern of the tire 1 when wear has progressed past the early stages. Note that FIG. 4A is a drawing illustrating a tread pattern of the tire 1 in the early stages of wear. "Early stages of wear" refers to a stage of wear for the tire 1 in which the grooves with the shallowest groove depth, for example, the center wide groove 17, have not disappeared. This includes when the tire 1 is new.

Note that according to one embodiment, the tread pattern 10 preferably further includes in the center region one or a plurality of center narrow grooves extending in the center block 21, 22 region. The center narrow groove preferably has a narrower groove width than the center wide groove 17, but may have the same or wider groove width than the center wide groove 17. The center narrow groove may open at one or both ends to the circumferential main groove 15, the center lug groove 11, or the center wide groove 17, or may terminate at both ends within the center block 21, 22 region.

The center lug grooves 11 are disposed at intervals in the tire circumferential direction in both the first center region Ce1 between the circumferential main groove 15 and the center wide groove 17 of the half-tread region Ta, and the second center region Ce2 between the circumferential main groove 15 and the center wide groove 17 of the half-tread region Tb. The first center region Ce1 and the second center region Ce2 are two regions formed by dividing the center region in the tire lateral direction by the center wide groove 17. The center lug groove 11 is a groove with a linear shape that extends at an incline with respect to the tire lateral direction and the tire circumferential direction and opens to the center wide groove 17. By the center lug groove 11 having a linear shape, the stone rejecting characteristics can be improved. The center lug groove 11 of the first center region Ce1 and the center lug groove 11 of the second center region Ce2 extend parallel with one another and open to the center wide groove 17 at different positions in the tire circumferential direction. By the center lug grooves 11 being disposed as such, the center lug groove 11 does not connect with the center lug groove 11 in the half-tread region on the opposite side, and these two center lug grooves 11 are divided by the center wide groove 17 in the tire lateral direction. In the present embodiment, the center wide groove 17 has a shallower groove depth than the center lug groove 11, and has a groove bottom raised by the center lug groove 11. Thus, the portion including the groove bottom of the center lug groove 11 at an end 11b of the center lug groove 11 that opens to the center wide groove 17 is blocked off in the tire lateral direction by a wall surface extending from the groove bottom of the center wide groove 17 inward in the tire radial direction. Accordingly, the air flowing through the center lug groove 11 hits this wall surface, allowing the portion extending radially inward from the groove bottom of the center wide groove 17 and the center block of the half-tread region on the opposite side to be cooled. Such a cooling function improves the heat build-up resistance.

The center lug groove 11 has a narrower groove width than the shoulder lug groove 13. This allows the ground contact pressure on the center blocks 21, 22 when running to be mitigated, and thus extend the wear life of the tire 1.

A plurality of the shoulder lug grooves 13 are disposed at intervals in the tire circumferential direction in both of the half-tread regions Ta, Tb. The shoulder lug grooves 13 in the half-tread regions Ta, Tb extend outward in the tire lateral direction and open to the closest ground contact edge of ground contact edges 10a, 10b on either side in the tire lateral direction.

The ground contact edges 10a, 10b are defined as follows. The ground contact edges 10a, 10b are end portions of the contact patch in the tire lateral direction when the tire is brought into contact with a horizontal surface under conditions of the tire 1 being fitted to a regular rim, inflated to the regular internal pressure, and loaded with 100% of the regular load. "Regular rim" refers to a "measuring rim" as defined by JATMA, a "Design Rim" as defined by TRA, and a "Measuring Rim" as defined by ETRTO. Additionally, "regular internal pressure" refers to a "maximum air pressure" as defined by JATMA, to the maximum value in "TIRE LOAD LIMITS AT VARIOUS COLD INFLATION PRESSURES" as defined by TRA, and to "INFLATION PRESSURES" as defined by ETRTO (European Tyre and Rim Technical Organisation). Additionally, "regular load" refers to a "maximum load capacity" as defined by JATMA, the maximum value in "TIRE LOAD LIMITS AT VARIOUS COLD INFLATION PRESSURES" as defined by TRA, and a "LOAD CAPACITY" as defined by ETRTO. Note that the positions of the ground contact edges 10a, 10b in the tire lateral direction match the positions of the ends of the tread width in the tire lateral direction described below.

The shoulder lug grooves 13 located on opposite sides in the tire lateral direction are disposed so that the position in the tire circumferential direction of the shoulder lug groove 13 in one half-tread region is between the positions in the tire circumferential direction of two adjacent shoulder lug grooves 13 in the other half-tread region.

The shoulder lug grooves 13 in the half-tread regions Ta, Tb each include an inner end 13a in the tire lateral direction located outward in the tire lateral direction of the position of the ends 11a (described below) of the center lug grooves 11 in the tire lateral direction. Additionally, in the tire circumferential direction, shoulder lug grooves 13 are disposed one by one in each of the shoulder regions between adjacent center lug grooves 11 in the tire circumferential direction of the center lug grooves 11. In this configuration, the ends 11a of the center lug grooves 11 and the inner ends 13a of the shoulder lug grooves 13 in the tire lateral direction alternately connect to the circumferential main groove 15 with a wave-like shape described below in the half-tread regions Ta, Tb. In FIG. 2, the shoulder lug grooves 13 change in groove width in the extension direction of the groove. However, the groove width may be constant.

The tread pattern 10 further includes the center blocks 21, 22 and shoulder blocks 27.

Figure 3:
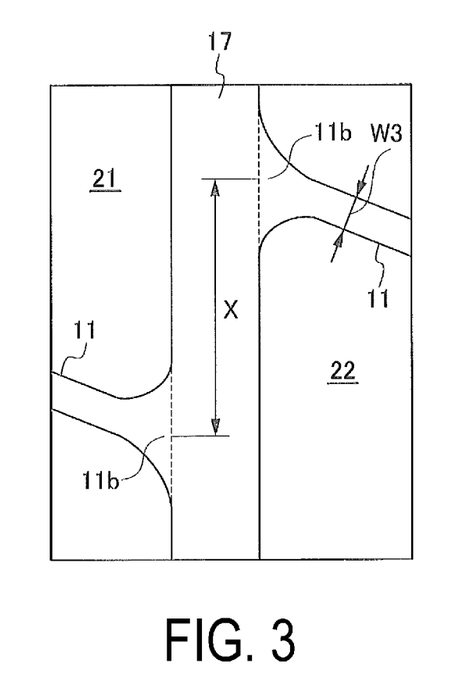
FIG. 3 is a drawing illustrating an enlarged portion of the tread pattern illustrated in FIG. 2.

The center blocks 21 are provided in the first center region Ce1 and the center block 22 are provided in the second center region Ce2. The center blocks 21, 22 are defined by adjacent center lug groove 11, the circumferential main groove 15, and the center wide groove 17, forming rows in the tire circumferential direction. By the center lug grooves 11 opening to the center wide groove 17 at different positions in the tire circumferential direction as described above, the center blocks 21 and center blocks 22 are offset in the tire circumferential direction. In one embodiment, the offset amount X (see FIG. 3) by which the center blocks 21 and center blocks 22 are offset in the tire circumferential direction is preferably equal to or greater than a groove width W3 (see FIG. 3) of the center lug grooves 11. The offset amount X corresponds to the amount by which the center lug grooves 11, 11 that met the center wide groove 17 on opposite sides in the tire lateral direction are offset. Accordingly, the air that flows through the center lug groove 11 can hit the portion extending radially inward from the groove bottom of the center wide groove 17 and the portion of the half-tread region on the opposite side susceptible to heat build-up caused by the rubber deformation. As a result, heat build-up resistance is improved. FIG. 3 is a drawing illustrating an enlarged portion of the tread pattern illustrated in FIG. 2. Note that the upper end (outer end in the tire radial direction) of the wall surface of the center lug groove 11 that extends radially inward from the groove bottom of the center wide groove 17 is indicated by a dashed line in FIG. 3. In one embodiment, the offset amount X preferably ranges from 0.25 times to 0.75 times the length of the center block 21 or center block 22 in the tire circumferential direction.

The shoulder blocks 27 in each of the half-tread regions Ta, Tb are defined in the tire circumferential direction by pairs of adjacent shoulder lug grooves 13 adjacent in the tire circumferential direction, the circumferential main grooves 15, and the ground contact edges 10a, 10b in the tire lateral direction of the tread portion that comes into contact with the road surface of the tread rubber 6, forming rows in the tire circumferential direction. In the example illustrated in FIG. 2, the shoulder blocks 27 are inclined toward the side opposite the side the center blocks 21, 22 are inclined with respect to the tire equator line CL.

According to one embodiment, in the tire 1, the ratio W1/W2 preferably ranges from 2.8 to 3.4, where W1 (see FIG. 2) is the groove width of the center wide groove 17 and W2 (see FIG. 2) is the groove width of the circumferential main grooves 15. When the ratio W1/W2 is 2.8 or greater, the difference in groove width between the center wide groove 17 and the circumferential main grooves 15 is great.

This allows stone rejecting characteristics to be maintained. Stone lodging typically occurs by stones lodging between groove walls that compose a groove. However, by the groove width of the center wide groove 17 being significantly wide, stone rejecting characteristics can be maintained at a level equivalent to that of a configuration without a center wide groove. According to one embodiment, the ratio W1/W2 preferably ranges from 2.6 to 3.1.

According to one embodiment, in the tire 1, the ratio D1/D2 preferably ranges from 0.05 to 0.2, where D1 (see FIG. 1) is the groove depth of the center wide groove 17 and D2 (see FIG. 1) is the groove depth of the circumferential main grooves 15. By the ratio D1/D2 being 0.2 or less, stone rejecting characteristics are improved. Additionally, by the ratio D1/D2 being 0.05 or greater, sufficient groove volume of the circumferential main grooves 15 can be ensured. As a result, heat build-up resistance is improved. According to one embodiment, the ratio D1/D2 preferably ranges from 0.1 to 0.2. Note that in relation to the grooves of the tread pattern 10, referring to simply the "groove depth" means the maximum groove depth in a configuration in which the groove depth is not constant, and the groove depth in a configuration in which the groove depth is constant. "Maximum groove depth" is, for example, the groove depth of a portion of the circumferential main groove 15 without a raised bottom in a configuration in which the circumferential main groove 15 is provided with a raised bottom portion 15c (described below). Additionally, the magnitude of D1 and D2 in FIG. 1 does not accurately represent the ratio of the present embodiment.

According to one embodiment, in the tire 1, the maximum groove depth of the circumferential main grooves 15 is preferably less than the maximum groove depth of the center lug grooves 11. The maximum groove depth of the center lug grooves 11 is preferably less than the maximum groove depth of the shoulder lug grooves 13. By the groove depth being defined as such, as the tire 1 wears, the circumferential main grooves 15 and the center lug grooves 11 disappear from the tread surface in this order, leaving the shoulder lug grooves 13. The center region of the tread portion experiences high ground contact pressure and due to the repeated deformation of the center blocks 21, 22 is susceptible to heat build-up. Accordingly, to improve heat build-up resistance, the maximum groove depth of the center lug grooves 11 is preferably equal to or greater than the maximum groove depth of the circumferential main grooves 15. When the maximum groove depth of the circumferential main grooves 15 is excessively great, the rigidity of the tread portion cannot be sufficiently ensured and the wear life cannot be increased. As a result, the maximum groove depth of the circumferential main grooves 15 is preferably shallower than the maximum groove depth of the center lug grooves 11.

According to one embodiment, in the tire 1, the ratio WB/W5 preferably ranges from 0.55 to 0.85, where WB (see FIG. 2) is the length in the tire lateral direction of the region occupied by the center block rows that include the row of center blocks 21 of the first center region Ce1 and the row of center blocks 22 of the second center region Ce2 and the center wide groove 17, and W5 is the belt width in the tire lateral direction of the outermost belt layer of the belt 4. The outermost belt layer of the belt 4, in FIG. 1, is the belt layer located outermost in the tire radial direction of the belt layers of the third cross belt layer 35. In a configuration in which the belt 4 is not provided with the third cross belt layer 35, the outermost belt layer is the belt layer located outermost in the tire radial direction of the second cross belt layer 33. By the outermost belt layer of the belt 4 closest to the center blocks 21, 22 having a greater width than the center blocks 21, 22, the center blocks 21, 22 are reinforced overall, and sufficient rigidity can be ensured. As a result, in the center region, excessive movement of each block can be suppressed, and stone rejecting characteristics and heat build-up resistance is improved. According to one embodiment, the ratio WB/W5 preferably ranges from 0.60 to 0.80.

Figure 5:
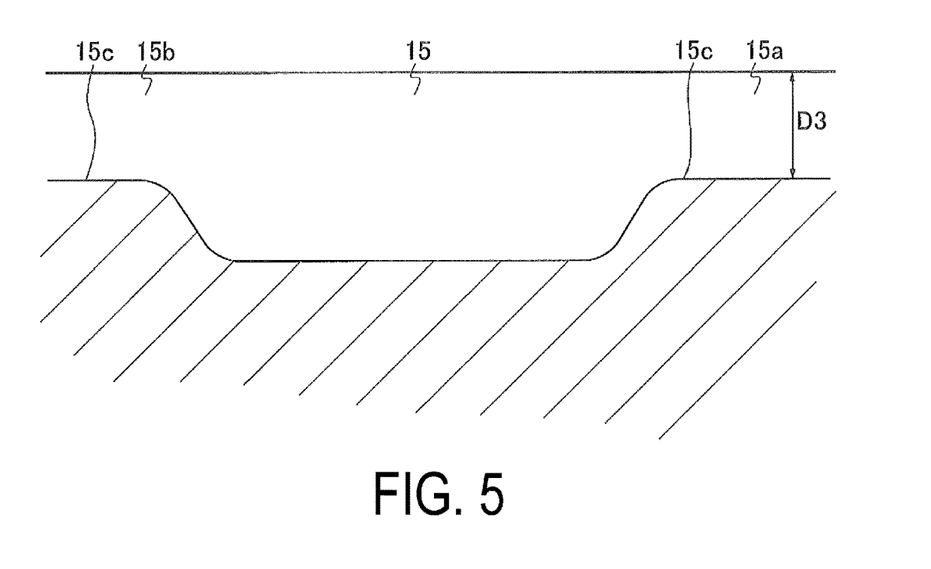
FIG. 5 is a cross-sectional view illustrating a raised bottom portion of a circumferential main groove of a heavy duty pneumatic tire according to an embodiment of the present technology.

According to one embodiment, as illustrated in FIG. 5, the tire 1 is preferably provided with raised bottom portions 15c, which are portions in each of the circumferential main grooves 15 where the groove is shallow. FIG. 5 illustrates the profile of a portion of the tread portion when the tire 1 is sectioned along a plane that includes the tire radial direction and the tire rotation axis, and passes through line V-V of FIG. 2. The raised bottom portions 15c are portions where the groove bottom is raised that correspond to the positions where the first groove turning portions 15a and the second groove turning portions 15b are disposed. By the circumferential main grooves 15 being provided with the raised bottom portions 15c, the function of discharging stones that enter the groove outside of the groove can be obtained. As a result, stone rejecting characteristics are improved. Additionally, the middle region of the circumferential main groove 15 that extends between the adjacent raised bottom portions 15c has a groove depth sufficient enough to ensure sufficient groove volume. As a result, heat build-up resistance is improved.

As illustrated in the drawings, the raised bottom portions 15c may have a constant shallow groove depth D3 or a non-constant groove depth. Note that the groove depth D3 is shallowest groove depth of the raised bottom portion 15c and the minimum groove depth of the circumferential main groove 15. In the example illustrated in FIG. 5, the raised bottom portions 15c are formed at positions corresponding to the first groove turning portion 15a and the second groove turning portion 15b. However, the raised bottom portion 15c may be formed in the middle region between the first groove turning portion 15a and the second groove turning portion 15b.

According to one embodiment, in the tire 1, the ratio D3/T preferably ranges from 0.01 to 0.05, where D3 (see FIG. 5) is the shallowest groove depth in the raised bottom portion 15c and T (see FIG. 2) is the tread width of the tread portion in the tire lateral direction. Tread width T refers to the periphery length along the contour running between the ground contact edges 10a, 10b of the tread portion in the tire lateral direction. By the ratio D3/T being 0.05 or less, the raised bottom portions 15c have the effect of further improving the stone rejecting characteristics. By the ratio D3/T being 0.01 or greater, the flow of air in the groove deteriorating can be prevented, and a reduction in heat build-up resistance can be suppressed. According to one embodiment, the ratio D3/T preferably ranges from 0.02 to 0.04.

According to one embodiment, the center wide groove 17 is preferably a linear groove that runs on the tire equator line CL. This improves the air flow in the center region and improves heat build-up resistance. Stones typically become lodged at two locations by the groove wall on both sides. In a configuration in which the center wide groove 17 has a linear shape, stones that enter the center wide groove 17 and become lodged can easily be discharged from the groove, thus making stone lodging unlikely. When the center wide groove has a non-linear shape such as a bent shape, stones typically become lodged at three locations by the groove wall and become fixed in the groove. This makes discharging stones from the groove difficult and stone lodging more likely to occur. Note that in the example illustrated in FIG. 2, the center wide groove 17 has a linear shape that runs along the tire equator line CL. However, in another embodiment, the center wide groove 17 may have a linear shape that does not run on the tire equator line CL, or may not have a linear shape. A center wide groove with a non-linear shape may include a groove turning portion similar to those of the groove turning portions 15a, 15b of the circumferential main grooves 15. In such a configuration, the center wide groove 17 may extend with a wave-like shape having the same or different period length as the circumferential main grooves 15, or may extend with a wave-like shape in phase or out of phase in the tire circumferential direction with one of the circumferential main grooves 15.

According to one embodiment, the ratio W1/D1 preferably ranges from 1.5 to 5.0, where D1 is the groove depth of the center wide groove 17 and W1 is the groove width of the center wide groove 17. When a wide groove with a wider groove width than the circumferential main grooves 15 is disposed in the center region, stones may easily lodge in the groove and stone rejecting characteristics may be reduced. However, in the tire 1 according to one embodiment, by the ratio W1/D1 being 1.5 or greater and the groove depth being less than the groove width, stones that enter the center wide groove 17 are easily discharged and stone rejecting characteristics are improved. Additionally, by the ratio W1/D1 being 5.0 or less, sufficient groove volume of the center wide groove 17 can be ensured. As a result, heat build-up resistance is improved. When the ratio W1/D1 is less than 1.5 or greater than 5.0, good heat build-up resistance and stone rejecting characteristics cannot be achieved in a compatible manner. According to one embodiment, the ratio W1/D1 preferably ranges from 2.0 to 4.0.

According to one embodiment, in the tire 1, each of the circumferential main grooves 15 and the center lug grooves 11 preferably has a groove width ranging from 7 mm to 20 mm. The circumferential main grooves 15 and the center lug grooves 11 have a groove width of 18 mm, for example. Note that by the groove width of the circumferential main grooves 15 and the center lug grooves 11 being in the range described above, the tire 1 is suitable for use as an off-road tire.

According to one embodiment, the tire 1 is suitable to be mounted on a construction vehicle or an industrial vehicle. Examples of construction vehicles and industrial vehicles include a dump truck, scraper, grader, shovel loader, tire roller, wheel crane, and truck crane as specified by JATMA, as well as a compactor, earth mover, grader, loader, and dozer as specified by TRA.

Figure 6:
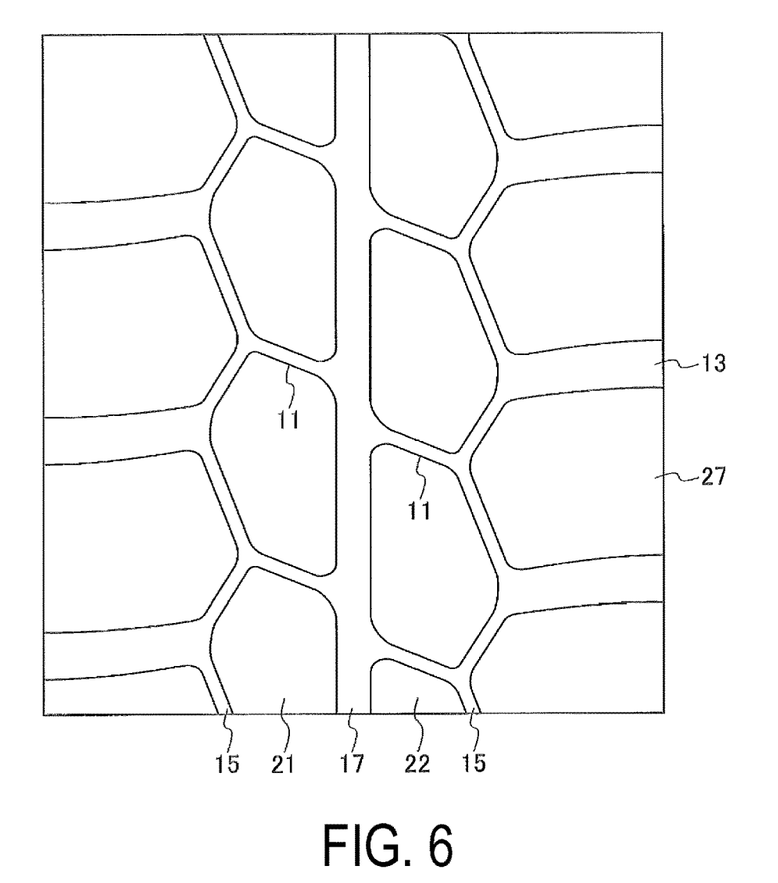
FIG. 6 is a drawing illustrating a modified example of the tread pattern illustrated in FIG. 2.

The tire 1 of the present embodiment, as a modified example, may include the tread pattern 10 illustrated in FIG. 6 instead of that of the example illustrated in FIG. 2. FIG. 6 is a developed plan view illustrating a modified example of the tread pattern illustrated in FIG. 2. In FIG. 6, the elements of the pattern 10 illustrated in FIG. 2 and elements corresponding thereto are denoted with the same reference sign used in FIG. 2.

In FIG. 6, the offset amount X is less than that of the example illustrated in FIG. 2. However, by the offset amount X being equal to or greater than the groove width W3 of the center lug grooves 11, heat build-up resistance is improved as described above.

According to the heavy duty pneumatic tire 1 of the present embodiment, two types of center lug grooves 11 parallel with one another and offset in the tire circumferential direction are disposed. This allows the air flowing through the center lug grooves 11 to hit the wall surface extending radially inward from the groove bottom of the center wide groove 17, which cools the portion extending radially inward from the groove bottom of the center wide groove 17 and the center block 21 or the center block 22 of the half-tread region on the opposite side. Such a cooling function improves the heat build-up resistance. By the center wide groove 17 with a wider groove width than the circumferential main grooves 15 being provided, sufficient groove volume is ensured in the center region. This ensures good air flow, and thus improves heat build-up resistance. By the groove depth of the center wide groove 17 being shallower than that of the circumferential main grooves 15 and the center lug grooves 11, stones that enter the groove are easily discharged. Thus, stone rejecting characteristics are improved. By the groove depth of the center wide groove 17 being constant, the stone discharging function can be obtained all around the tire circumferential direction, ensuring constant stone rejecting characteristics in the tire circumferential direction.

When the ratio D1/D2 is 0.2 or less, stone rejecting characteristics are improved. Additionally, by the ratio D1/D2 being 0.05 or greater, sufficient groove volume of the center wide groove 17 can be ensured. As a result, heat build-up resistance is improved.

The maximum groove depth of the circumferential main grooves 15 is preferably less than the maximum groove depth of the center lug grooves 11. The maximum groove depth of the center lug grooves 11 is preferably less than the maximum groove depth of the shoulder lug grooves 13. Specifically, the center region of the tread portion experiences high ground contact pressure and due to the repeated deformation of the center blocks 21, 22 is susceptible to heat build-up. Accordingly, to improve heat build-up resistance, the maximum groove depth of the center lug grooves 11 is preferably equal to or greater than the maximum groove depth of the circumferential main grooves 15. When the maximum groove depth of the circumferential main grooves 15 is excessively great, the rigidity of the tread portion cannot be sufficiently ensured and the wear life cannot be increased. As a result, the maximum groove depth of the circumferential main grooves 15 is preferably shallower than that of the center lug grooves 11.

By the ratio Wb/W5 ranging from 0.55 to 0.85 and the outermost belt layer of the belt 4 closest to the center blocks 21, 22 having a greater width than the center blocks 21, 22, the center blocks 21, 22 are reinforced overall, and rigidity can be increased. As a result, deformation in which the center region of the tread portion recesses inward in the tire radial direction is less likely to occur when relatively large stones enter the center region. This reduces the likelihood of stones entering the groove. Accordingly, stone rejecting characteristics are further improved. Additionally, the rigidity of the center blocks 21, 22 is increased. This allows excessive movement of each block to be suppressed and heat build-up resistance to be improved.

By the circumferential main grooves 15 being provided with the raised bottom portions 15c, stones are prevented from entering the grooves and the function of discharging stones that enter the groove outside of the groove can be obtained. As a result, stone rejecting characteristics are improved. Additionally, the middle region of the circumferential main groove 15 that extends between the adjacent raised bottom portions 15c has a groove depth sufficient enough to ensure sufficient groove volume. As a result, heat build-up resistance is improved.

By the ratio D3/T being 0.05 or less, the raised bottom portions 15c have the effect of further improving the stone rejecting characteristics. By the ratio D3/T being 0.01 or greater, the flow of air in the groove deteriorating can be prevented, and a reduction in heat build-up resistance can be suppressed.

By the center wide groove 17 having a linear shape that runs along the tire equator line CL, the air flow in the center region is improved and heat build-up resistance is improved. The center wide groove 17 having a linear shape also makes stone lodging less likely to occur.

According to one embodiment, in the tire 1, by the ratio W1/D1 being 1.5 or greater and the groove depth being relatively shallow, stones that enter the center wide groove 17 are easily discharged and stone rejecting characteristics are improved. Additionally, by the ratio W1/D1 being 5.0 or less, the groove depth is made not excessively shallow and sufficient groove volume can be ensured. As a result, heat build-up resistance is improved.

Configurations in which the groove width of each of the circumferential main grooves 15 and the center lug grooves 11 ranges from 7 mm to 20 mm are suitable for use as an off-road tire.

According to one embodiment, the tire 1 is suitable to be mounted on a construction vehicle or an industrial vehicle.

Examples

To examine the heat build-up resistance in the tread center region and stone rejecting characteristics, test tires with the different tread patterns as indicated in Tables 1 to 3 were manufactured (Examples 1 to 13, Comparative Examples 1 to 3). The test tires of Examples 1 to 13 and Comparative Examples 1 to 3 used the tread pattern illustrated in FIG. 2 and had the parameters indicated in Tables 1 to 3.

The size of the test tires was 33.00R51. The test tires were mounted on a rim with a size of 51×24-5.0 and inflated to 700 kPa (TRA specified maximum air pressure). Under these conditions, tests for heat build-up resistance and stone rejecting characteristics were performed.

Heat Build-Up Resistance

The test tires were mounted on an indoor drum testing machine and loaded with 110% of the TRA maximum specified load (38750 kg). Under these conditions, starting at a speed of 5 km/h, the speed was increased by 1 km/h every 12 hours. The running time up until when the tire failed due to heat build-up was measured. The results are expressed as index values, with the result of Comparative Example 1 being defined as 100. Larger index values indicate superior heat build-up resistance.

Stone Rejecting Characteristics

The test tires were mounted on an actual vehicle and loaded with the TRA specified maximum load (38750 kg). Under these conditions, the vehicle was driven back and forth two times on a 300 m section of a quarry blanketed with stones ranging from 2 to 20 mm in size. Thereafter, the number of stones lodged in the grooves bordering the center blocks (circumferential main grooves and center lug grooves) and the grooves in the center region (center wide grooves) was visually observed. The results are expressed as index values, with the result of Comparative Example 1 being defined as 102. Larger index values indicate superior stone rejecting characteristics. Note that index values equal to or greater than 100 are considered to indicate stone rejecting characteristics equal to or greater than that of Comparative Example 1.

A result was evaluated as having achieved good heat build-up resistance and stone rejecting characteristics when the index value for both heat build-up resistance and stone rejecting characteristics is 100 or greater and the total of both index values comes to 206 or greater.

TABLE 1

|  | Comparative Example 1 | Comparative Example 2 | Comparative Example 3 | Example 1 |
|---|---|---|---|---|
| Circumferential main grooves? | Yes | Yes | Yes | Yes |
| Two types of center lug grooves parallel with one another and offset in tire circumferential direction? | Yes | Yes | Yes | Yes |
| Center wide groove? | No | Yes | Yes | Yes |
| Center wide groove has shallower groove depth than circumferential main grooves and center lug grooves? | No | No | Shallower | Shallower |
| Center wide groove has constant groove depth? | No | No | No | Constant |
| D1/D2 | — | 0.3 | 0.3 | 0.3 |
| W1/W2 | — | 3.6 | 3.6 | 3.6 |
| WB/W5 | 0.45 | 0.45 | 0.45 | 0.45 |
| D3/T | 0.06 | 0.06 | 0.06 | 0.06 |
| Shape of center wide groove | — | Linear | Linear | Linear |
| W1/D1 | — | 0.5 | 0.5 | 0.5 |
| Stone rejecting characteristics | 102 | 96 | 98 | 100 |
| Heat build-up resistance | 100 | 107 | 107 | 107 |

As can be seen from Table 1, a configuration (Example 1) that includes a pair of circumferential main grooves, two types of center lug grooves parallel with one another and offset in the tire circumferential direction, and a center wide groove, and in which the center wide groove has a constant groove depth that is shallower than that of the circumferential main grooves and the center lug grooves can achieve good heat build-up resistance and stone rejecting characteristics in a compatible manner.

A configuration (Comparative Example 3) in which the groove depth of the center wide groove is non-constant has reduced stone rejecting characteristics. Note that for the configuration in which the groove depth of the center wide groove is non-constant, a configuration in which the groove depth of the center wide groove at the portion that connects to the center lug groove is the same as the maximum groove depth of the center lug groove was employed.

A configuration (Comparative Example 2) like Comparative Example 3 except that that the groove depth of the center wide groove is not shallower than that of the circumferential main grooves and the center lug grooves has further reduced stone rejecting characteristics. Note that for the configuration in which the groove depth of the center wide groove is not shallower than the maximum groove depth of the circumferential main grooves and the center lug grooves, a configuration in which the groove depth of the center wide groove is shallower than the maximum groove depth of the center lug grooves but equal to the maximum groove depth of the circumferential main grooves was employed.

TABLE 2

|  | Example 2 | Example 3 | Example 4 | Example 5 | Example 6 | Example 7 |
|---|---|---|---|---|---|---|
| Circumferential main grooves? | Yes | Yes | Yes | Yes | Yes | Yes |
| Two types of center lug grooves parallel with one another and offset in tire circumferential direction? | Yes | Yes | Yes | Yes | Yes | Yes |
| Center wide groove? | Yes | Yes | Yes | Yes | Yes | Yes |
| Center wide groove has shallower groove depth than circumferential main grooves and center lug grooves? | Shallower | Shallower | Shallower | Shallower | Shallower | Shallower |
| Center wide groove has constant groove depth? | Constant | Constant | Constant | Constant | Constant | Constant |
| D1/D2 | 0.2 | 0.1 | 0.2 | 0.2 | 0.2 | 0.2 |
| W1/W2 | 3.6 | 3.6 | 2.6 | 3.1 | 3.1 | 3.1 |
| WB/W5 | 0.45 | 0.45 | 0.45 | 0.7 | 0.5 | 0.9 |
| D3/T | 0.06 | 0.06 | 0.06 | 0.06 | 0.06 | 0.06 |
| Shape of center wide groove | Linear | Linear | Linear | Linear | Linear | Linear |
| W1/D1 | 0.5 | 0.5 | 0.5 | 0.5 | 0.5 | 0.5 |
| Stone rejecting characteristics | 102 | 102 | 104 | 104 | 102 | 100 |
| Heat build-up resistance | 107 | 106 | 112 | 114 | 107 | 108 |

As can be seen from Tables 1 and 2, a configuration (Examples 2 and 3) in which the ratio D1/D2 ranges from 0.05 to 0.2 has better stone rejecting characteristics and substantially equal heat build-up resistance compared to a configuration (Example 1) in which the ratio D1/D2 is greater than 0.2.

As can be seen from Table 2, a configuration (Example 5) in which the ratio W1/W2 ranges from 2.8 to 3.4 has better heat build-up resistance compared to a configuration (Example 4) in which the W1/W2 is less than 2.8. Additionally, compared to a configuration (Example 2) in which W1/W2 is greater than 3.4, it has better heat build-up resistance and stone rejecting characteristics.

A configuration (Example 5) in which the ratio Wb/W5 ranges from 0.55 to 0.85 has better heat build-up resistance and stone rejecting characteristics compared to a configuration (Example 6) in which the ratio Wb/W5 is less than 0.55 and a configuration (Example 7) in which the ratio WB/W5 is greater than 0.85.

TABLE 3

|  | Example 8 | Example 9 | Example 10 | Example 11 | Example 12 | Example 13 |
|---|---|---|---|---|---|---|
| Circumferential main grooves? | Yes | Yes | Yes | Yes | Yes | Yes |
| Two types of center lug grooves parallel with one another and offset in tire circumferential direction? | Yes | Yes | Yes | Yes | Yes | Yes |
| Center wide groove? | Yes | Yes | Yes | Yes | Yes | Yes |
| Center wide groove has shallower groove depth than circumferential main grooves and center lug grooves? | Shallower | Shallower | Shallower | Shallower | Shallower | Shallower |
| Center wide groove has constant groove depth? | Constant | Constant | Constant | Constant | Constant | Constant |
| D1/D2 | 0.2 | 0.2 | 0.2 | 0.2 | 0.2 | 0.2 |
| W1/W2 | 3.1 | 3.1 | 3.1 | 3.1 | 3.1 | 3.1 |
| WB/W5 | 0.7 | 0.7 | 0.7 | 0.7 | 0.7 | 0.7 |
| D3/T | 0.04 | 0.04 | 0.04 | 0.04 | 0.04 | 0.04 |
| Shape of center wide groove | Linear | Non-linear | Linear | Linear | Linear | Linear |
| W1/D1 | 0.5 | 0.5 | 1.5 | 3.0 | 5.0 | 6.0 |
| Stone rejecting characteristics | 106 | 104 | 107 | 112 | 111 | 107 |
| Heat build-up resistance | 117 | 114 | 120 | 122 | 119 | 116 |

As can be seen from Tables 2 and 3, a configuration (Example 8) in which the ratio D3/T ranges from 0.01 to 0.05 has better heat build-up resistance and stone rejecting characteristics compared to a configuration (Example 5) in which the ratio D3/T is greater than 0.05. The reason why the heat build-up resistance is improved is considered to be because the groove depth D3 of the raised bottom portions 15c is relatively shallow. This increases the effect of suppressing a decrease in the block rigidity of the shoulder regions and the center region, and can suppress heat build-up caused by movement of the rubber.

A configuration (Example 8) in which the center wide groove has a linear shape that runs along the tire equator line CL has improved heat build-up resistance and stone rejecting characteristics compared to a compared to a configuration (Example 9) in which the center wide groove is non-linear. Note that configurations in which the center wide groove is non-linear employ a center wide groove that is inclined with respect to the tire circumferential direction and the tire lateral direction so as to intersect the tire equator line.

Configuration (Examples 10 to 12) in which the ratio W1/D1 ranges from 1.5 to 5.0 has improved heat build-up resistance and stone rejecting characteristics compared to a configuration (Example 8) in which the ratio W1/D1 is less than 1.5. Additionally, a configuration (Example 13) in which the ratio W1/D1 exceeds 5.0 has improved heat build-up resistance while stone rejecting characteristics are at least maintained.

The heavy duty pneumatic tire according to embodiments of the present technology has been described in detail above. However, it should be understood that the present technology is not limited to the above embodiments, but may be improved or modified in various ways so long as these improvements or modifications remain within the scope of the present technology.

The invention claimed is:

1. A heavy duty pneumatic tire, comprising:
a tread pattern comprising
a pair of circumferential main grooves with a wave-like shape in a tire circumferential direction disposed in half-tread regions on a first side and a second side in a tire lateral direction of a tire equator line;
a center wide groove with a groove width wider than a groove width of the pair of circumferential main grooves that extends in the tire circumferential direction in a center region between the pair of circumferential main grooves;
a plurality of center lug grooves disposed at intervals in the tire circumferential direction in a first center region and a second center region, the first center region being located between one of the circumferential main grooves in the half-tread region on the first side and the center wide groove, the second center region being located between one of the circumferential main grooves located in the half-tread region on the second side and the center wide groove, the plurality of center lug grooves each having a linear shape that extend at an incline with respect to the tire lateral direction and the tire circumferential direction and open to the center wide groove; and
a plurality of shoulder lug grooves disposed at intervals in the tire circumferential direction in both of the half-tread regions that extend outward in the tire lateral direction, with outer ends in the tire lateral direction that open to ground contact edges in the tire lateral direction, inner ends of the plurality of shoulder lug grooves in the tire lateral direction being located outward in the tire lateral direction of outer ends of the plurality of center lug grooves in the tire lateral direction, and the plurality of shoulder lug grooves being disposed one by one, in the tire circumferential direction, between adjacent center lug grooves of the plurality of center lug grooves adjacent in the tire circumferential direction;
the pair of circumferential main grooves each including a first groove turning portion that curves or bends protruding outward in the tire lateral direction and a second groove turning portion that curves or bends inward in the tire lateral direction, so that the pair of circumferential main grooves alternately connect to the outer ends of the plurality of center lug grooves in the tire lateral direction and the inner ends of the plurality of shoulder lug grooves in the tire lateral direction;
the plurality of center lug grooves and the pair of circumferential main grooves having groove widths narrower than groove widths of the plurality of shoulder lug grooves;
the plurality of center lug grooves disposed in the first center region and the plurality of center lug grooves disposed in the second center region extending parallel with one another and opening to the center wide groove at alternating positions in the tire circumferential direction;
an offset amount corresponding to an amount by which an opening to the center wide groove of a center lug groove of the plurality of center lug grooves disposed in the first region is offset from an opening to the center wide groove of a center lug groove of the plurality of center lug grooves disposed in the second region is from 0.25 times to 0.75 times a length in the circumferential direction of a center block defined by adjacent center lug grooves of the plurality of center lug grooves disposed in the first region or the second region; and
the center wide groove having a constant groove depth that is shallower than a maximum groove depth of the pair of circumferential main grooves and the plurality of center lug grooves.

2. The heavy duty pneumatic tire according to claim 1, wherein a ratio W1/W2 ranges from 2.8 to 3.4, where W1 is the groove width of the center wide groove and W2 is the groove width of the pair of circumferential main grooves.

3. The heavy duty pneumatic tire according to claim 2, wherein a ratio D1/D2 ranges from 0.05 to 0.2, where D1 is the groove depth of the center wide groove and D2 is a maximum groove depth of the pair of circumferential main grooves.

4. The heavy duty pneumatic tire according to claim 3, wherein the pair of circumferential main grooves have a shallower maximum groove depth than the plurality of center lug grooves; and the plurality of center lug grooves have a shallower maximum groove depth than the plurality of shoulder lug grooves.

5. The heavy duty pneumatic tire according to claim 4, further comprising
a belt portion comprising a pair of cross belt layers with belt cords inclined with respect to the tire circumferential direction to opposite sides in the tire lateral direction; and wherein
the tread pattern comprises a plurality of center blocks, including the center block, formed in a row in the tire circumferential direction in the first center region and the second center region defined by the adjacent center lug grooves, the pair of circumferential main grooves, and the center wide groove; and
a ratio WB/W5 ranges from 0.55 to 0.85, where WB is a length in the tire lateral direction of a region occupied by center block rows comprising a row of the center blocks of the first center region and a row of the center blocks of the second center region and the center wide groove, and W5 is a belt width in the tire lateral direction of an outermost belt layer of the belt portion.

6. The heavy duty pneumatic tire according to claim 5, wherein the pair circumferential main grooves each comprise a raised bottom portion which is a portion where a groove depth becomes shallower partially.

7. The heavy duty pneumatic tire according to claim 6, wherein a ratio D3/T ranges from 0.01 to 0.05, where D3 is a shallowest groove depth in the raised bottom portion and T is a tread width of the tread portion in the tire lateral direction.

8. The heavy duty pneumatic tire according to claim 7, wherein the center wide groove has a linear shape that runs on the tire equator line.

9. The heavy duty pneumatic tire according to claim 8, wherein a ratio W1/D1 ranges from 1.5 to 5.0, where D1 is the groove depth of the center wide groove and W1 is the groove width of the center wide groove.

10. The heavy duty pneumatic tire according to claim 9, wherein each of the pair of circumferential main grooves and the plurality of center lug grooves has a groove width ranging from 7 mm to 20 mm.

11. The heavy duty pneumatic tire according to claim 10, wherein the heavy duty pneumatic tire is mountable on a construction vehicle or an industrial vehicle.

12. The heavy duty pneumatic tire according to claim 1, wherein a ratio D1/D2 ranges from 0.05 to 0.2, where D1 is the groove depth of the center wide groove and D2 is a maximum groove depth of the pair of circumferential main grooves.

13. The heavy duty pneumatic tire according to claim 1, wherein the pair of circumferential main grooves have a shallower maximum groove depth than the plurality of center lug grooves; and the plurality of center lug grooves have a shallower maximum groove depth than the plurality of shoulder lug grooves.

14. The heavy duty pneumatic tire according to claim 1, further comprising
a belt portion comprising a pair of cross belt layers with belt cords inclined with respect to the tire circumferential direction to opposite sides in the tire lateral direction; and wherein
the tread pattern comprises a plurality of center blocks, including the center block, formed in a row in the tire circumferential direction in the first center region and the second center region defined by the adjacent center lug grooves, the pair of circumferential main grooves, and the center wide groove; and
a ratio WB/W5 ranges from 0.55 to 0.85, where WB is a length in the tire lateral direction of a region occupied by center block rows comprising a row of the center blocks of the first center region and a row of the center blocks of the second center region and the center wide groove, and W5 is a belt width in the tire lateral direction of an outermost belt layer of the belt portion.

15. The heavy duty pneumatic tire according to claim 1, wherein the pair circumferential main grooves each comprise a raised bottom portion which is a portion where a groove depth becomes shallower partially.

16. The heavy duty pneumatic tire according to claim 15, wherein a ratio D3/T ranges from 0.01 to 0.05, where D3 is a shallowest groove depth in the raised bottom portion and T is a tread width of the tread portion in the tire lateral direction.

17. The heavy duty pneumatic tire according to claim 1, wherein the center wide groove has a linear shape that runs on the tire equator line.

18. The heavy duty pneumatic tire according to claim 1, wherein a ratio W1/D1 ranges from 1.5 to 5.0, where D1 is the groove depth of the center wide groove and W1 is the groove width of the center wide groove.

19. The heavy duty pneumatic tire according to claim 1, wherein each of the pair of circumferential main grooves and the plurality of center lug grooves has a groove width ranging from 7 mm to 20 mm.

20. The heavy duty pneumatic tire according to claim 1, wherein the heavy duty pneumatic tire is mountable on a construction vehicle or an industrial vehicle.

* * * * *